May 19, 1970 R. NEBOLSINE ET AL 3,512,649
ULTRA-RATE WATER FILTRATION APPARATUS
Filed March 15, 1966 4 Sheets-Sheet 4
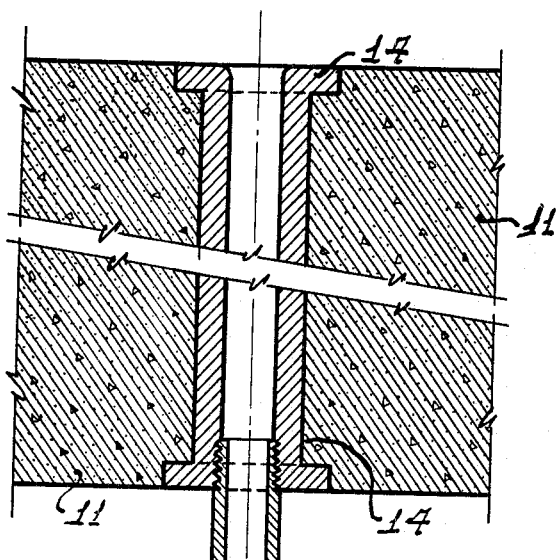
FIG. 4
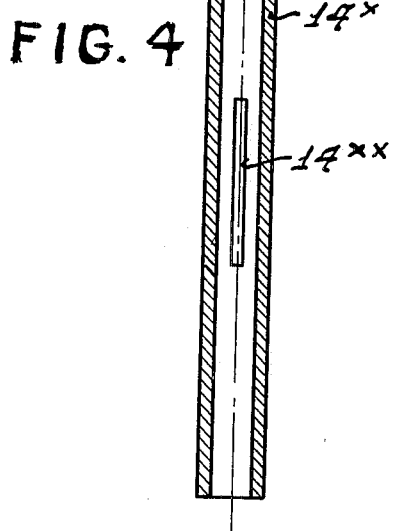
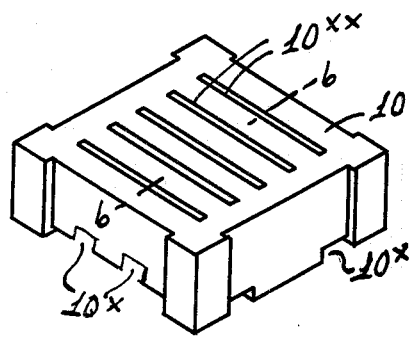
FIG. 5.
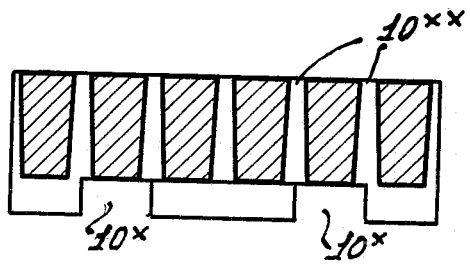
FIG. 6
FIG. 7
INVENTORS
Rostislav Nebolsine
Albert S. Toth and
BY Rudolph J. Sanday
M. Lee Helms
Attorney United States Patent Office 3,512,649
Patented May 19, 1970

3,512,649
ULTRA-RATE WATER FILTRATION APPARATUS
Rostislav Nebolsine, 64 E. 86th St. 10028; Albert S. Toth, 205 W. End Ave. 10013; and Rudolph J. Sanday, 239 W. 12th St. 10014, all of New York, N.Y.
Filed Mar. 15, 1966, Ser. No. 534,399
Int. Cl. B01d 23/16, 23/18
U.S. Cl. 210—274          1 Claim

ABSTRACT OF THE DISCLOSURE

An ultra-rate water filtration apparatus comprising a casing formed with a first upstanding wall and coordinate walls bounding a deep filter chamber for industrial use, and carrying at its upper area a second wall-coordinate bounding a fluid receiving chamber, said first upstanding wall having at its lower area below the base of said filter chamber a wall coordinate bounding a chamber for receiving clarified fluid, distributor troughs in the filter chamber at its upper area and in register with and receiving fluid through openings in a wall of the fluid-receiving chamber, a floor wall in the filter chamber, means for supporting said floor wall substantially above the base of said fluid-receiving chamber, a plurality of distributor blocks on the floor wall and adapted to support a filter bed and being formed with through-slots therein for passage of fluid, a plurality of open-ended tubular nozzles passing through said floor wall and having flow connection with said distributor blocks, a valved back-wash discharge pipe extending from said fluid receiving chamber, a valved back-wash inflow pipe and also a valved outflow pipe extending into the filter chamber below its floor wall, and means for admitting jets of air under pressure to the area of the filter chamber below said floor wall thereof for agitating the filter bed during back-wash thereof.

---

The principal objective of our ultra-high rate water filtration apparatus is to treat water, or other liquids, containing a concentration of suspended matter of from 20 milligrams per liter to 500 milligrams per liter by removing the suspended matter to a level below 20 milligrams per liter at extremely high filtration rates of from 12 to 90 gallons per minute per square foot. The treatment process is not required to produce continuously clear water as may be the case of filtration producing drinking water.

Ultra-high rate water filtration is applicable wherever used water must be improved by removing suspended particles before the treated water can be used, reused, or finally discharged to the receiving body of water. The degree of treatment is determined by the end use, or disposal of water. The degree of treatment is controlled by the ultra-high rate of filtration and the type of media. Other significant process factors include the very deep bed of media, a nominal operating head loss, period of expected operation before cleaning the bed and the method of cleaning by backwashing with high rates of both water and air. The ultra-high rate filtration unit is kept in operation indefinitely by automatic backwash cleaning without residual accumulation of solids in the bed.

By the present invention filtering is accomplished by utilizing pressure, or potential energy to pass the water through the media and filter appurtenances. The energy required is related to the ultra-high rate of flow and the capability of the filter media to pass this flow and still separate out the required portion of suspended matter. Thus the length and width of the filter unit determining the area of the filter is a factor which multiplied by the ultra-high rate of water filtration results in the filtering capacity of the unit. The filtering capacity is provided by the filter bottom comprised of nozzles, blocks and structural supports, with a nominal head loss not to exceed two feet of water and yet to provide for uniform distribution of filtrate to a clear water well.

Our apparatus is particularly applicable for industrial use, examples being in the extraction of fine solids from steel plant discharge water, mining discharge water and discharge water from paper mills. In the drawings a single unit is illustrated. In practice each unit may be about 15 feet by 15 feet, horizontally, with walls 26 feet high. Sixteen units may be arranged in two rows of 8 units, separated by a pipe gallery. The arrangement results in two identical filter groupings so that each can operate independently. To facilitate independent operation, separate influent channels, backwash water conduits, wash water pipes, air headers, and operating controls are provided.

The invention will now be described with reference to the accompanying drawings, in which:

FIG. 4 is a detailed view showing one of the nozzles and the mounting therefor;

FIG. 5 is a perspective view showing one of the distributor blocks;

FIG. 6 is a vertical section through FIG. 5, taken on the line 6—6.

FIG. 7 is a vertical section through a suitable form of distributor trough to be located above the filter bed, one of which being indicated in FIG. 2.

Figure 1:
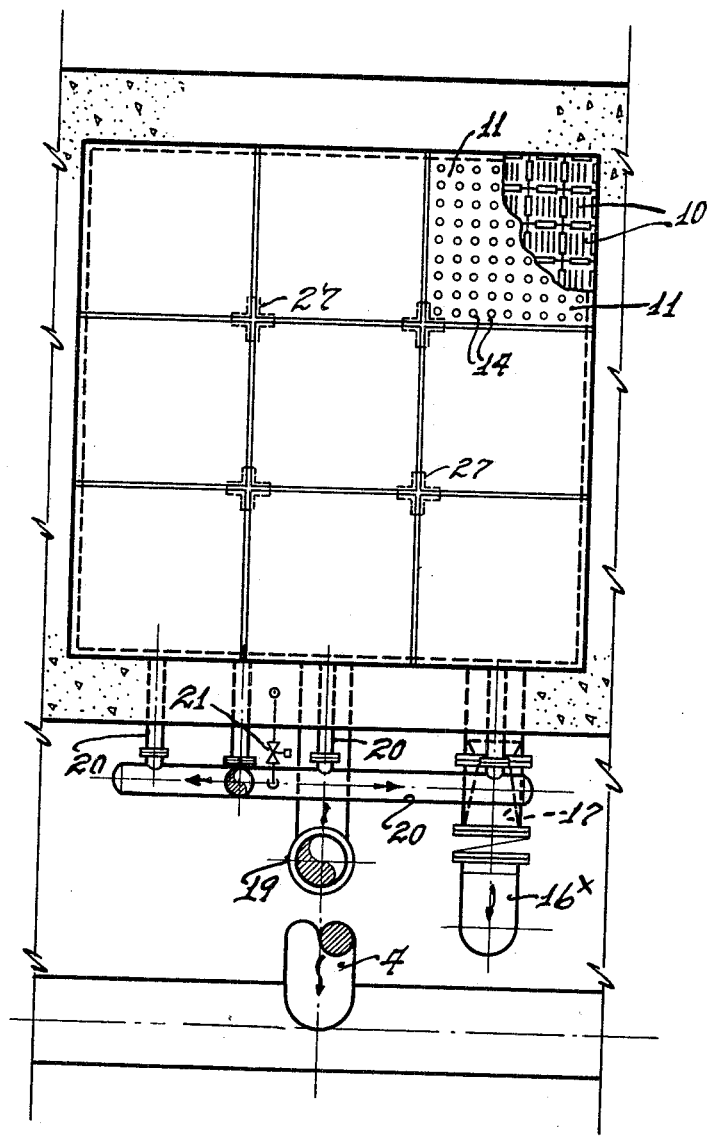
FIG. 1 is a top plan view showing one of the filtering units with certain accompanying piping therefor.
Figure 2:
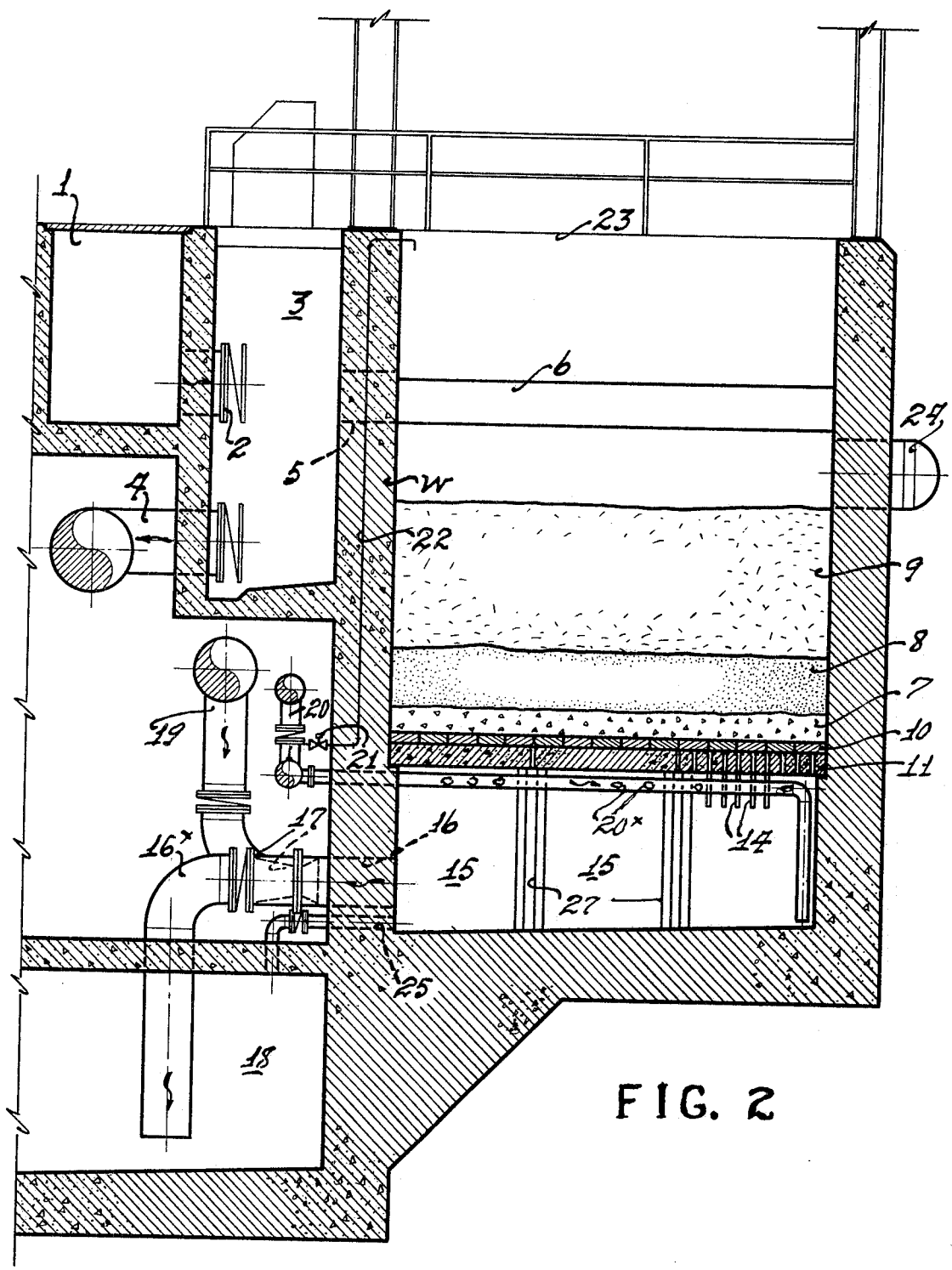
FIG. 2 is a vertical section through the filter unit shown in FIG. 1, taken generally, and enlarged, certain piping having been broken away and with valve indications therein.

Referring to the drawings and FIGS. 1 and 2, it will be seen that the filter unit therein shown, being, in practice, one of a group as hereinbefore stated, is encompassed by concrete walls, preferably rectangular, so that the units may be placed side by side. In the structure of FIG. 2, walls exterior of those which immediately bound the filter bed, provide an influent flume as shown at 1. The fluid, containing parts to be separated is passed into flume 1 and by mean of valve-controlled pipe 2, passes into chamber at 3 at a time when a wash-water discharge pipe 4 is closed. The aqueous mixture rises in chamber 3 until it reaches an opening indicated at 5, FIG. 2, and hence passes through the opening into the distributor trough 6 shown in FIG. 2. In practice there will be a plurality of said distributor troughs, of which a cross-section of one trough is shown in FIG. 7.

The fluid, containing particles to be removed, flows out of the troughs and passes downwardly into the filter bed below them.

For industrial use, as mentioned above, the bed is deep and preferably about 84 inches in depth, and the interior of the filtering chamber may be 15 by 15 feet in area, the chamber having a preferred height of 28 to 30 feet. In FIG. 2 the bottom layer of the filter bed, indicated at 7, is composed of gravel on which is a layer of sand 8, and upon this sand is a substantially thick layer, preferably of crushed anthracite, as indicated at 9. The filter bed rests upon distributor blocks of special formation, indicated generally in FIG. 2 at 10.

FIGS. 5 and 6 illustrate one of the distributor blocks in perspective and cross-section. Each block is formed of cast concrete or allied material and has crossed channel-ways as indicated at $10^x$. Also, each block is provided with a plurality of spaced channels 10ˣˣ, which taper downwardly from a relatively narrow width to a relatively wide width, and it will be seen that the discharge ends of the channelways lie above the support for each block in the groups thereof.

The support for the distributor blocks is the concrete floor 11, shown in FIG. 2, and which extends from wall to wall of the unit enclosing the filter bed. It is preferred that the floor member be supported between the walls by vertical posts. Posts 27, in the embodiment being cruciform, are employed and which rise from the bottom wall of the concrete structure to the bed supporting floor 11.

Figure 3:
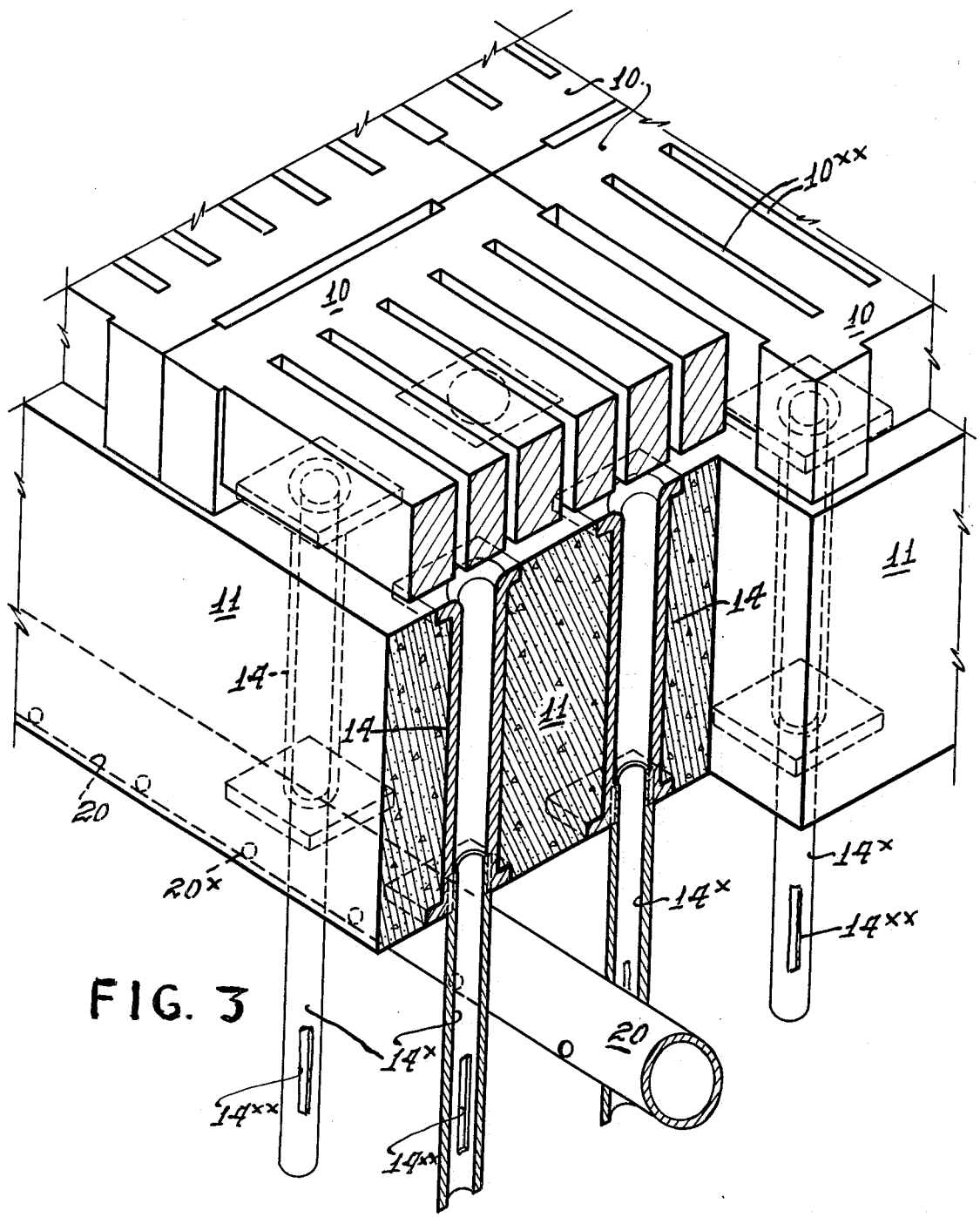
FIG. 3 is an enlarged fragmentary view partly in section showing the mounting of the distributor blocks on a concrete support, the blocks being slotted and mounted to communicate with a plurality of downwardly directed nozzles.

In FIG. 2 a plurality of distributor blocks 10 are shown fragmentarily as lying upon and supported by the concrete floor area 11. Passing upwardly through the floor 11 are rows of closely related pipes, hereinafter termed nozzles 14, best shown in FIG. 3. In the embodiment of FIG. 3, these nozzles are constructed of two elements, the lower element 14ˣ being a tube having one or more lateral slots 14ˣˣ below the concrete floor, and to 14ˣ in each case may be threaded into the upper nozzle member 14. Member 14 is preferably formed at top and bottom with flange areas, as shown in FIG. 3.

As hereinabove stated, the embodiment shown in FIG. 2 is provided with an inlet flume 1 and a receiving chamber 3 for the fluid mixture to be filtered. These chambers are not indicated in the embodiment of FIG. 1, nor are the troughs shown. This is because of simplicity of illustration, the primary purpose of FIG. 1 being to illustrate the preferred relationship of groups of distributor blocks, etc. A description of the flow of liquid to be filtered will now be given:

The liquid to be filtered passes from chamber 1, FIG. 2, into chamber 3, whilst valve for charge conduit 4 is closed. The liquid then rises in chamber 3 until it is discharged through opening 5, and enters an appropriate one of the several distributor troughs. The liquid overflowing the troughs passes downwardly onto the top of the filter bed and thence through the latter to the distributor blocks 10, the latter being supported with respect to their slotted areas above the floor in 11. Therefore the distributor blocks are only diagrammatically related to the flooring in FIG. 2, but are shown in actual position in FIG. 3.

It will be seen that the slots in the distributor blocks are specially formed with slot areas tapering outwardly from the top to an increased width at the base, so as to prevent obstruction by particles of greater than usual size. The minor width of each slot of a distributor block, may be three-eighth inch at the top and extending to one-half inch at the base, although these measurements are variable. It will be further seen that the liquid passing through the distributor blocks discharges into the upstanding nozzles 14, 14ˣ and into a lowermost chamber 15. From chamber 15 the clarified fluid is discharged through wall aperture 16 into a discharge pipe 16ˣ having a venturi-type control valve, of known design, indicated at 17. Clarified water flows into a "clear water" chamber 18 which will be so related to an abutting or adjacent unit as to provide a common "clear water" collection chamber.

Means are provided for periodically aerating and backwashing the filter bed to carry off filtered out sediment particles, and this is accomplished as follows:

Referring to FIG. 2, the inlet valve 2 is closed and the valve of the backwash supply pipe 19 is open. Pipe 19 communicates with chamber 15 and flows upwardly through nozzles 14, 14ˣ, and hence upwardly through the filter bed, passing over the lips of the distributor troughs 6, and out through openings 5 in wall W of FIG. 2 and thence to and through valve control pipe 4 to a point of collection of the sediment enriched wash water. However, preliminary to the outflow of the wash water from the filter bed chamber, air under sufficient pressure as to pass through the fluid within the filter chamber and to agitate the filter bed is employed. Referring to FIG. 2, an air inlet pipe is provided, as indicated at 20, and which has a horizontal extension passing into chamber 15 below the floor 11, and said extension of the air in the inlet pipe is perforated, as indicated at 20ˣ, FIG. 2. Inflowing air and water volumes are then proportionately admitted into the base of the filter bed by the side and bottom openings in the nozzle 14, the side openings being indicated at 14ˣˣ in FIG. 3. The air agitates the filter bed media particles and lossens the solids picked up thereby. The final step in back washing is to increase the rate of water flow to a relatively high rate which results in carrying the loosened solids upwardly and out of the filter bed to the back wash water conduit 4. After back washing the apparatus is set into normal operation, through turning off the back wash water closing the valve of pipe 4 and turning off the air inlet of pipe 20. Thereupon trapped air in air pipe extension of pipe 20 may be vented, by opening a valve 21 in vent pipe 22, the discharge end of the latter being at the top of the apparatus below a walkway at 23.

The unit is provided with an access above the filter bed, as diagrammatically indicated at 24, FIG. 2, and a similar manhole opening may be provided for chamber 15 below the filter bed. In FIG. 2 there is shown a valve controlled drain pipe 25 for de-watering the unit.

The above description and the drawings relate primarily to gravity operation, since in FIG. 2 the structure is shown open at the top thereof. The process may be operated under pressure by closing the top of the structure, which then will be completely sealed and resistant to the operating pressure. In such case the filtrate will be collected in a pressure conduit or chamber.

Returning to the back washing, the back washing cycle preferably includes three distinct steps. The first is to reverse the flow and apply wash water at a rate so as to loosen the media. The second part is to admit air for scrubbing while the water rate is maintained at a sufficient level for agitation. The final step involves shutting off the air and increasing the water rate so that a definite expansion in the bed is obtained and maintained at this level until dirty water volume in the bed is displaced and all loosened material is carried upward to the back wash troughs and removed from the filter bed. The complete back washing cycle may require about fifteen minutes. The back wash water carrying the solids from the filter bed may be directed to a clarifier-thickener in order to consolidate the solids to a sludge of 40 to 50% solids. The overflow from this treatment unit can be directed back for refiltering.

For the embodiment shown, it has been found that air pressure of ten p.s.i. is sufficient to cause penetration of the air through the filter bed and to pass above the water level. This air pressure passing through the nozzles 14 emerges through the slots in the distributor blocks under somewhat increasing density due to the tapering formations of the slots, and dislodges any sediment which may be held on the slot walls.

By means of the invention, fine solids from industrial discharge waste water may be extracted, including metal oxides and similar fine particles ranging even below 20 microns to sub-microns. In the past filtration of fine solids, it has generally been deemed unfeasible to secure a waste water flow of more than six gallons p.s.f. of the filter bed surface. By the present invention, this rate is enormously increased and the apparatus can operate 15–90 gallons per square foot of the filter bed surface, due particularly to the combination with the slotted distributor blocks of a bed flooring provided with the rows of downwardly extending nozzles discharging into a collection chamber from which the filtered water passes to a collection member, and these instrumentalities have further special utility in the cleansing of the filter bed by agitating the bed media particles, loosening the solids picked up thereby in agitation by air and back washing, the back washing carrying the loosened solids upwardly and out of the filter bed to a point of discharge.

It will be understood that various modifications may be made in the form and arrangement of the elements illustrated in the embodiment of the invention, without departing from the spirit thereof. The height of one unit has hereinbefore been mentioned, and that height is such that the chamber area intermediate chambers 1 and 18, is sufficient for a walkway when two units are joined side by side at the left hand vertical broken line of FIG. 2. Thus one unit will have its lateral walls beyond wall W of FIG. 2 at the right hand side and the second unit will have like walls at the left hand side, thus providing a walkway for an operator to control the valves disposed in the walkway chamber thus provided. When, as will repeatedly be the case, the units are arranged in successive joined pairs, the walkway will extend from pair to pair as well as chamber 1, chamber 18 and chamber 3.

Having described my invention, what I claim and desire to secure by Letters Patent is as follows:

1. An ultra-rate water filtration apparatus comprising a concrete casing formed with a first upstanding wall and coordinate walls bounding a deep industrial filter chamber and carrying at its upper side area a second upstanding wall and coordinate walls bounding a fluid-receiving chamber, said first upstanding wall having at its lower area and exterior thereof coordinate walls bounding a chamber for receiving clarified fluid, horizontally positioned distributor troughs in the filter chamber across its upper area above the filter bed and receiving fluid directly through openings in a wall of the fluid-receiving chamber first named, a floor wall in the filter chamber, means for supporting said floor wall substantially above the base of the filter chamber, a plurality of distributor blocks on the flooring and adapted to support a filter bed, said distributor blocks being formed with through-slots therein for the passage of fluid, a plurality of open-ended tubular nozzles passing through the floor wall to a distance below the same and having flow communication with the slots in the distributor blocks, a valved back-wash discharge pipe extending from said fluid receiving chamber, a valved back-wash inflow pipe and also a valved outflow pipe extending from the filter chamber below its floor wall, and means for admitting jets of air to the area of the filter chamber below said floor wall thereof for agitating the filter bed during back wash thereof.

References Cited

UNITED STATES PATENTS

| | | | |
|---|---|---|---|
| 647,780 | 4/1900 | Wilson | 210—264 |
| 1,572,398 | 2/1926 | Leopold | 210—293 X |
| 1,698,079 | 1/1929 | Wagner | 210—293 X |
| 1,871,122 | 8/1932 | Kretzschmar | 210—274 |
| 2,559,784 | 7/1951 | Moore | 210—275 X |
| 2,559,936 | 7/1951 | Buffle | 210—274 |
| 3,134,735 | 5/1964 | Greenleaf | 210—293 X |

FOREIGN PATENTS

| | | |
|---|---|---|
| 500,378 | 2/1939 | Great Britain. |

SAMIH N. ZAHARNA, Primary Examiner

U.S. Cl. X.R.

210—279, 293